(12) United States Patent
Desmond et al.

(10) Patent No.: US 10,397,752 B2
(45) Date of Patent: Aug. 27, 2019

(54) REAL-TIME DISCOVERY OF INTERESTS OF INDIVIDUALS AND ORGANIZATIONS PARTICIPATING IN A PHYSICAL EVENT

(71) Applicant: International Business Machines Corporation, Armonk, NY (US)

(72) Inventors: Michael Desmond, White Plains, NY (US); Sophia Krasikov, Katonah, NY (US); Pietro Mazzoleni, New York City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 449 days.

(21) Appl. No.: 15/005,058

(22) Filed: Jan. 25, 2016

(65) Prior Publication Data

US 2017/0212898 A1    Jul. 27, 2017

(51) Int. Cl.

| | |
|---|---|
| *G06Q 10/06* | (2012.01) |
| *H04W 4/21* | (2018.01) |
| *H04W 4/80* | (2018.01) |
| *G06F 16/9537* | (2019.01) |
| *G06F 17/30* | (2006.01) |
| *H04W 4/04* | (2009.01) |

(52) U.S. Cl.
CPC .......... *H04W 4/04* (2013.01); *G06F 16/9537* (2019.01); *G06Q 10/06* (2013.01); *H04W 4/21* (2018.02); *H04W 4/80* (2018.02)

(58) Field of Classification Search
CPC ........ G06F 17/30864; G06F 17/30867; G06Q 30/02

USPC ................ 707/728, 792, 749; 705/7.29, 14.1
See application file for complete search history.

(56) References Cited

U.S. PATENT DOCUMENTS

| | | |
|---|---|---|
| 7,113,088 B2 | 9/2006 | Frick et al. |
| 8,838,466 B2 | 9/2014 | Richardson et al. |
| 8,868,406 B2 | 10/2014 | Tirumalachetty et al. |
| 10,009,868 B1 * | 6/2018 | Reyes ................... H04W 64/00 |

(Continued)

FOREIGN PATENT DOCUMENTS

| | | |
|---|---|---|
| WO | 2004/051985 A1 | 6/2004 |
| WO | 2008/007382 A2 | 1/2008 |
| WO | 2012/149565 A2 | 11/2012 |

*Primary Examiner* — William Spieler
(74) *Attorney, Agent, or Firm* — Cantor Colburn LLP; Robert Bunker (57) ABSTRACT

An aspect of the disclosure includes a method, a system and a computer program product for matching a participant with an interest group at a venue. The system including computer inputs that receive signals identifying locations of participants in a venue having sessions, the computer inputs identifying a session location for each participant. An aggregator is coupled the computer inputs and determines interests of each participant by aggregating common session characteristics with participant behavioral characteristics and ranking a degree of interests for each participant. A matcher is coupled to the aggregator receives interest group ranked lists for each interest group, the matcher further matching the interest group to the participant by matching the degree of interests for each participant to the interest group interests. A signal output is coupled to the matcher and transmits an output signal to a representative based on a relevancy parameter being above a threshold.

17 Claims, 8 Drawing Sheets

(56) References Cited

U.S. PATENT DOCUMENTS

| | | | |
|---|---|---|---|
| 2007/0181664 A1* | 8/2007 | Hatzav | G06K 17/00 235/375 |
| 2008/0154883 A1 | 6/2008 | Gamaley et al. | |
| 2009/0125387 A1* | 5/2009 | Mak | G06Q 10/02 705/14.73 |
| 2009/0276403 A1* | 11/2009 | Tamayo | G06Q 10/109 |
| 2010/0063892 A1* | 3/2010 | Keronen | G06Q 30/04 705/26.1 |
| 2010/0088372 A1 | 4/2010 | Shridhar et al. | |
| 2011/0173235 A1* | 7/2011 | Aman | A63B 24/0021 707/792 |
| 2011/0276440 A1* | 11/2011 | Collins | G06Q 10/06 705/28 |
| 2012/0036079 A1 | 2/2012 | Jacob Sushil et al. | |
| 2012/0167010 A1 | 6/2012 | Campbell et al. | |
| 2012/0232958 A1* | 9/2012 | Silbert | G06Q 30/02 705/7.34 |
| 2013/0046590 A1* | 2/2013 | Abraham | G06Q 30/02 705/14.1 |
| 2013/0097186 A1* | 4/2013 | van Hoff | H04L 67/306 707/749 |
| 2014/0040281 A1* | 2/2014 | Spivack | G06F 17/3053 707/748 |
| 2014/0297457 A1 | 10/2014 | Sapugay et al. | |
| 2015/0006286 A1* | 1/2015 | Liu | G06Q 50/01 705/14.53 |
| 2015/0134655 A1 | 5/2015 | Gamaley et al. | |
| 2016/0125426 A1* | 5/2016 | Francolla | G06Q 30/0201 705/7.29 |
| 2016/0212266 A1* | 7/2016 | Soundar | H04M 3/5235 |
| 2017/0031996 A1* | 2/2017 | Priness | G06F 17/30528 |
| 2017/0078156 A1* | 3/2017 | Lazarescu | H04L 67/42 |

\* cited by examiner

REAL-TIME DISCOVERY OF INTERESTS OF INDIVIDUALS AND ORGANIZATIONS PARTICIPATING IN A PHYSICAL EVENT

BACKGROUND

The present invention relates generally to a system and method for matching participant interests with those of an interest group, and in particular to a system and method of real-time or near real-time matching of participants and interest groups at a venue.

Conference event systems exist to manage events such as professional conferences, conventions, and trade shows. Typically, participants are registered into corresponding databases by providing their names, emails, company names, and the sessions the participant plans to attend. The aim of conference event systems is to organize and track participants in order to improve future conferences for the participants and the organizers, or to enable participants to continue networking after the conference ends.

SUMMARY

Embodiments include a method, system, and computer program product for matching a participant with an interest group at a venue. The system including one or more computer inputs configured to receive input signals identifying locations of one or more participants in a venue, the venue having one or more sessions, the one or more computer inputs configured to identify a respective session location of the venue for each of the one or more participants. An aggregator is coupled for communication to the one or more computer inputs, the aggregator configured to determine one or more interests of each of the one or more participants by aggregating common session characteristics with participant behavioral characteristics and ranking a degree of interests for each of the one or more participants. A matcher is coupled for communication to the aggregator and configured to receive one or more interest group ranked lists of interest group interests for each of one or more interest groups, each of the one or more interest groups including at least one representative, the matcher further configured to match one or more of the one or more interest groups to one or more of the one or more participants by matching the degree of interests for each of the one or more participants to the interest group interests. A signal output is coupled for communication to the matcher, the signal output being configured to transmit an output signal to the at least one representative based on a relevancy parameter between the degree of interests of one of the one or more participants and the one or more interest groups associated with the at least one representative is above a threshold.

In an embodiment, the method receiving input signals at one or more computer inputs, the input signals identifying locations of one or more participants in a venue and a respective session location of the venue the one or more participants are attending. An aggregator determines one or more interests of each of the one or more participants by aggregating common session characteristics with participant behavioral characteristics and ranking a degree of interests for each of the one or more participants. One or more interest group ranked lists of interest group interests are received for each of one or more interest groups. A matcher matches one or more of the one or more interest groups to one or more of the one or more participants by matching the degree of interests to the interest group interests. An output signal is transmitted to one or more representatives based on a relevancy parameter between the degree of interests of one of the one or more participants and the one or more interest groups associated with the at least one representative is above a threshold.

In still another embodiment, a computer program product for matching a participant with an interest group at a venue is provided. The computer program product comprises a computer readable storage medium having program instructions embodied therewith, the program instructions executable by a processor to cause the processor to perform: receiving input signals at one or more computer inputs, the input signals identifying locations of one or more participants in the venue and a respective session location of the venue the participant is attending; determining one or more interests of each of the one or more participants by aggregating common session characteristics with participant behavioral characteristics and ranking a degree of interests for each of the one or more participants; receiving one or more interest group ranked lists of interest group interests for each of one or more interest groups; matching one or more of the one or more interest groups to one or more of the one or more participants by matching the degree of interests to the interest group interests; and transmitting an output signal to one or more representatives based on a relevancy parameter between the degree of interests of one of the one or more participants and the interest group associated with the at least one representative is above a threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

When developing, marketing and selling a product and/or a service, a company may take into account a multitude of factors, such as customer's interest, demand for the product/ service, demand for particular individual features, changes in product-development technologies, competing companies' products/services, and other relevant factors. In addition, some products/services maybe changed over their life cycle based on customer demand shifts. One means of collecting data on a product is at a venue, such as a conference event for example, where a large number of customers or potential customers will be present.

Due to the potentially large amount of customer input that may be received in a short amount of time, any data collected during a conference event can be useful for developing a strategy for creating, marketing, or selling of a product/service/feature. The collected data can also help in detecting leads and contacts, which the sales team might use to enrich the knowledge of its existing pool of customers.

One of the factors indicating an interest in existing products/services and demand for future features in products/services may be determined by analyzing the popularity of topics presented at event sessions. The topics may be identified or categorized at the conference by attendee-industry, attendee-organizations, by each participant and by the event as a whole. This helps the conference hosts to better understand participant's interest in products/services/features, which in turn helps a company enhance its strategy and/or better clarify which products to continue assertively promoting, and which ones to change, enhance or customize.

Embodiments of the present disclosure provide for a system and method for the real-time or near-real time matching an interest or a set of interests of a participant or an organization attending an event at a venue with those of an interest group. In an embodiment, the system gathers information about participants during an event and determines an interest parameter and transmits information or metrics about the participants to one or more members of the interest group when the interest parameter is above a threshold. Some embodiments described herein provide for efficiencies in identifying potential customers to a sales representative at a venue.

As used herein, the term "venue" refers an interaction between two or more individuals during a period of time. A venue may include to a location, or a plurality of locations, where a group of individuals, corporations or organizations have congregated for the purpose of an interaction. The term "venue" includes, but is not limited to, a location or a plurality of locations where a conference, trade show, demonstration, fair, educational event, sporting event, or music concert is being held. As used herein, the term "session" includes a physical location, a time duration and a delivery information form. The physical location includes, but is not limited to, a room, a booth or a studio for example. The delivery information form includes, but is not limited to, a lecture, a presentation or a seminar for example. As used herein, the term "topic" includes a subject matter, theme, idea or issue that is discussed with, or presented to, participants during a session.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
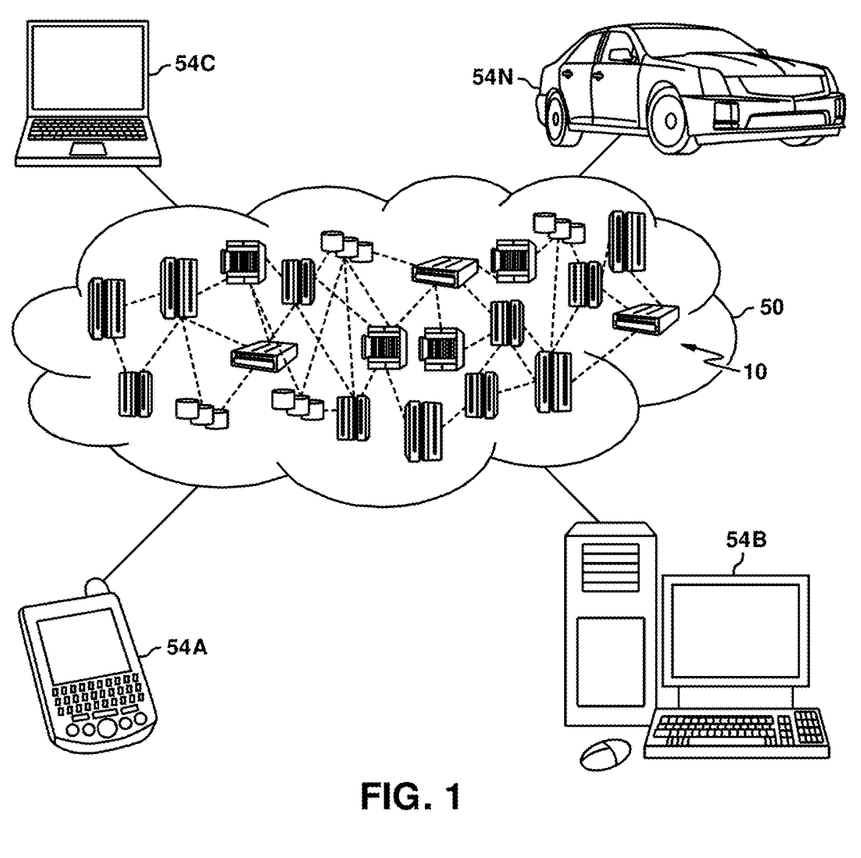
FIG. 1 depicts a cloud computing environment according to an embodiment.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
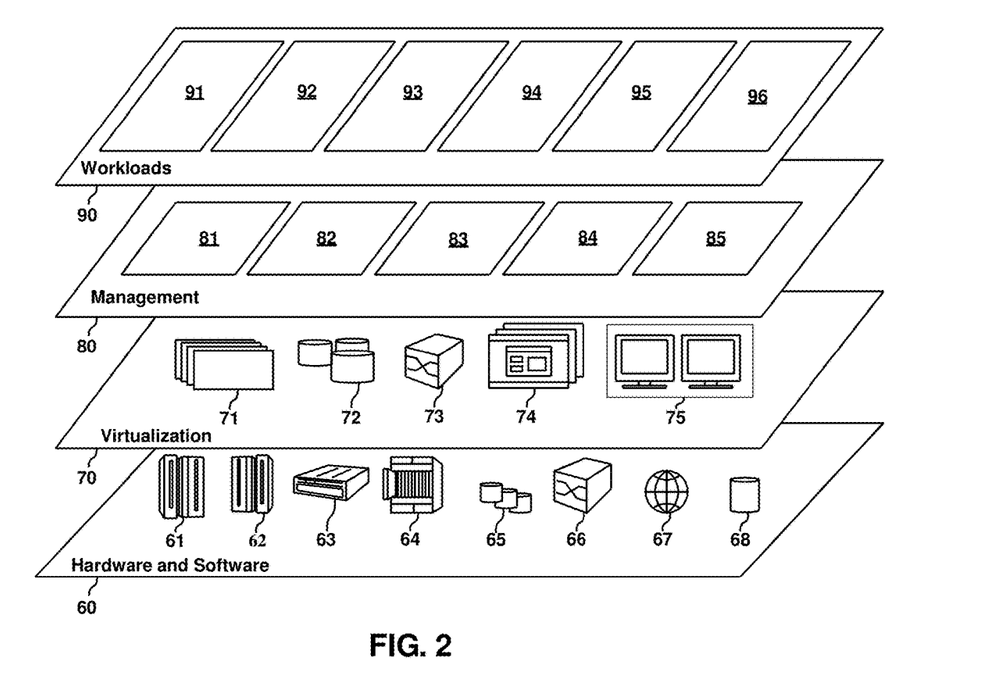
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a venue interests matching processing 96. The venue interests matching processing 96 may perform one or more methods that allow for the collection of information about participants and matching of the participant's interests with those of an interest group, such as but not limited to the methods described in reference to FIGS. 3-5 for example.

Figure 3:
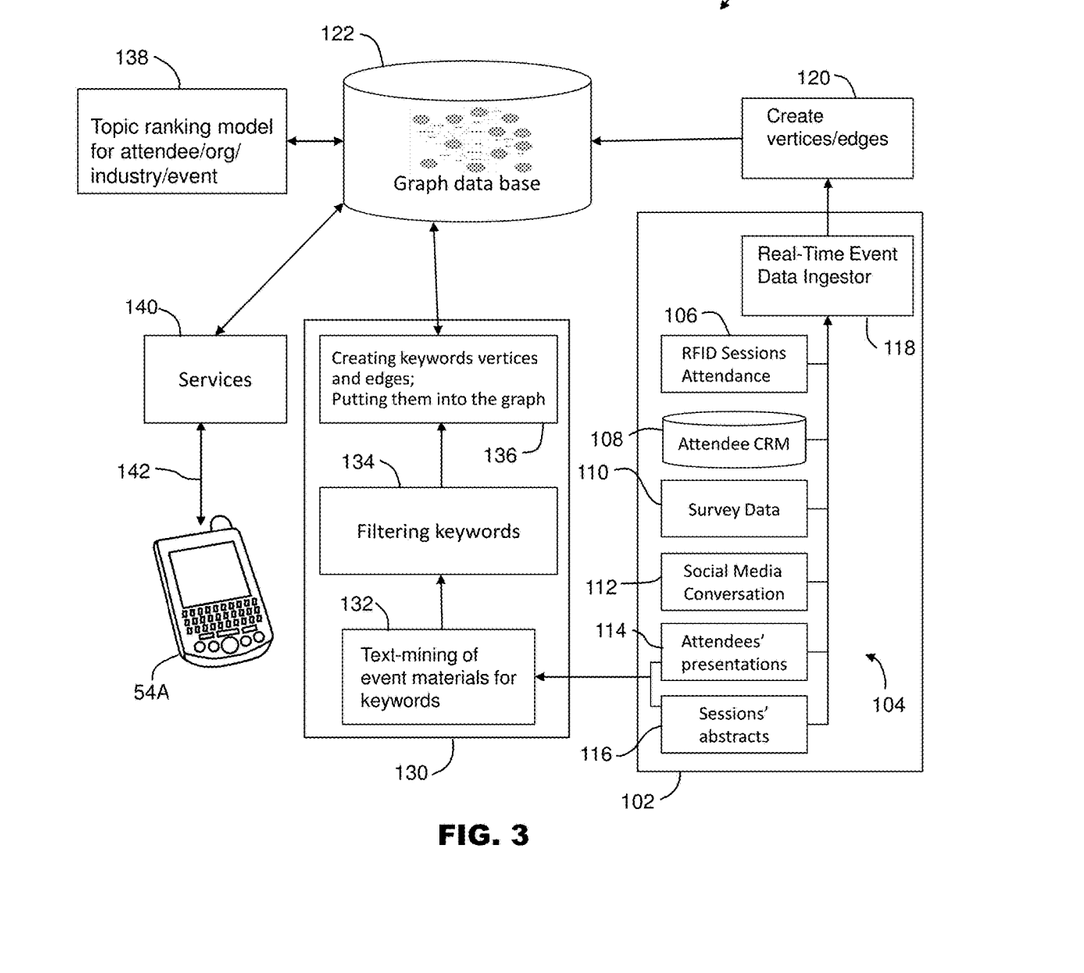
FIG. 3 depicts a flow diagram for a system of matching the interests of participants with those of an interest group in accordance with some embodiments.

Referring now to FIG. 3, an embodiment is shown of a system 100 for matching participants at a venue with an interest group. As used herein, an interest group may be any group of individuals that are organized (either formally or informally) for a common purpose or goal. An interest group may be, but is not limited to, a corporation (e.g. a product manufacturer such as a tool manufacturer), a trade association (e.g. an organization that focuses on public relations or collaboration between companies), a social group (e.g. a club or association focused on a particular subject matter such as woodworking or construction), a client organization, a booth owner, or a venue organizer for example. In the exemplary embodiment, the venue may be a conference that includes participants interested in the topics presented at the conference and the interest groups may include any or all of the groups described above. However, it should be appreciated that this is for exemplary purposes and the claimed invention should not be so limited.

The system 100 includes an aggregator 102 that collects data from a plurality of data sources 104. In an embodiment, at least some of the data sources 104 are selected based on the topics or expected topics for the venue. For a conference type venue, the data sources 104 may include session attendance data 106, attendee customer relation management (CRM) data 108, survey data 110, social media conversation data 112, attendee presentation data 114 and session abstracts 116 for example. The customer CRM data 108 may include information about the participants, such as the company or organization they are employed by or associated with, their job title and educational background for example. The survey data 110 may include questionnaires or feedback forms completed by participants at the end of sessions for example. The attendee presentation data 114 may include session white papers, session hand-outs, presentation materials, poster session materials or transcripts of the sessions for example.

In an embodiment, the aggregator 102 includes a data ingestor module 118 that collects the data from the data sources 104 and transfers the data to graph database generator module 120. The ingestor module 118 collects the data on a real-time or in near real-time basis. In one embodiment, the ingestor module 118 collects data on a periodic or aperiodic basis. In one embodiment, the ingestor module 118 collects data based on the length of sessions within the venue (e.g. every 30 minutes or 1 hour).

Figure 4:
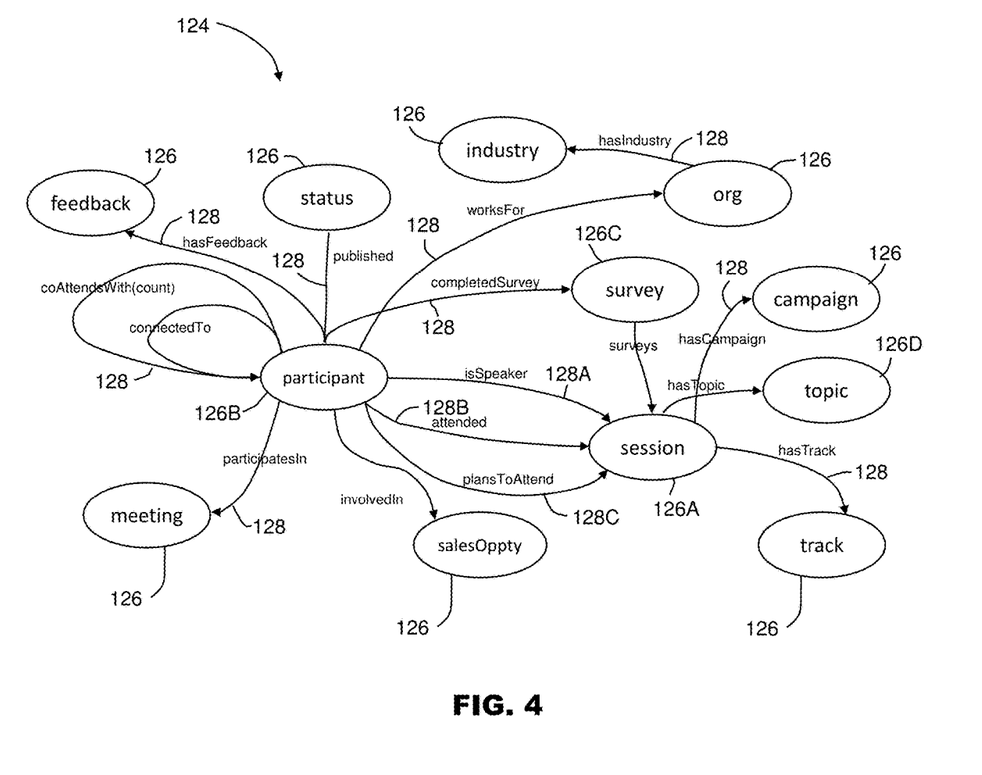
FIG. 4 depicts a graph database diagram for use with the system of FIG. 3 in accordance with some embodiments.

The graph database generator module 120 uses the collected data to create vertices/nodes and edges for a graph database 122. As used herein, a vertex may be a contextual keyword extracted from the collected data, while edges represent relationships between the vertices. Once the vertices and edges are created, the graph 122 is populated. An example of a graph database 124 is shown in FIG. 4. The database 124 includes vertices 126, that represent data extracted from 104. Each of the vertices 126 is connected to other vertices 126 by one or more edges 128. For example, the "session" vertices 126A may be related to the attendee vertices 126B by edges such as speaker data 128A, the session attendance 128B (e.g. a timer measures the length of time the participant was at the session as a percentage of the total session duration), and the participant's plan to attend the session 128C (e.g. did the participant plan to attend). The session vertices 126A may also have relationships with other vertices, such as survey vertices 126C and topics vertices 126D for example.

Referring back to FIG. 3, the aggregator 102 further provides collected data on the materials provided at the venue to participants, such as sessions abstracts data 116 and attendees presentations 114 for example. This venue data is transferred to a text-mining module 130 where a set of keywords is extracted in block 132 from a session abstracts and filtered in block 134. These keywords could include one or more words of topics discussed in a session. The filtered keywords are then used to create vertices and edges in block 136 and transferred to the graph database 122.

In an embodiment, the graph database 122 also receives data from and transfers data to a topic ranking module 138. The topic ranking module 138 determines relative relevance parameter for each of the topics in a session by using existing text-mining methodologies. The resulting relevance scores may then be used as factors in a topic ranking model for determining interests of individual participants.

In an embodiment, the topic ranking module determines relative relevance of topics for each of the participants. The score for a topic across the sessions attended by a participant Pi is defined as:

$$\text{SCORE}_1 = f(R_{l,k}, A_k/D_k, W_k, N_l) \quad (1)$$

Where the participants are referred to Pi, i=1, . . . , I and sessions attended by participants referred as $S_k$ (k=1, . . . , K). The relevance is denoted by $R_{1,k}$, l=1, . . . , L, the rank of the a topic $T_l$ in the a session $S_k$.

The model adjusts the relevance score using various factors, which are represented in the ranking model as rank factors. Factors used to determine the relevance rank include the topic's rank $R_{l,k}$ determined from text mining module 130. The ratio $A_k/D_k$ of the session attendance time $A_k$ and the duration of the session $D_k$. For example, if the participant left a session after 10 min and the session had a duration of 60 min, the attendance ratio indicates the loss of interest in the session topics, leading to adjustment of the topic score. Other factors, such as scheduling conflicts, or scheduling multiple popular or similar sessions in the same time slot, may represent confounding factors for evaluating the popularity of a session topic at a conference. Likewise, the popularity of a given session topic may depend on the popularity/influence of the speaker rather than the subject.

A session 'weight' $W_k$ indicates an importance of the session to a participant. If the participant planned to attend the session (by including it in his calendar schedule) and then in fact attended the session, the session weight may be defined as 1. If the participant attended a session that was not planned, the session's weight might be set to a smaller value, for example 0.8. In case the session was planned but not attended, the weight might be set to 0.5. The co-occurrence factor $N_l$ may be defined as a number of co-occurrences of the same topic among sessions attended by a participant.

In an embodiment, for a given topic across the sessions attended by a participant the total score for a topic may be defined as:

$$\text{SCORE}_1 = \text{SUM}k(R_{l,k}*A_k/D_k*W_k)*N_l \quad (2)$$

In an embodiment, participants' participation score could be an additional factor included in the model as well. A participation score represents how well participants have participated/attended the available sessions during the event. A lower score signifies less participation in the event sessions, which could be an indication of the participant low interest in the session topics. A higher score means attendees have found the sessions useful and relevant. The score is computed by first grouping parallel sessions to identify sessions available and then the user attendance is examined in each session slot. A session slot is considered utilized if an attendee has attended a session in it. The score is then computed as 'session utilized'/'session slots available'.

In some embodiments, another factor that could be included in the model is the weight of the client's participant's position/title. Other factors may include, but are not limited to, the products sold by the participant (or the participant's employer), existing sales lead opportunities and discussions by the participant on social media.

In still further embodiments, the ranking of a topic may be performed for each organization at the venue (e.g. aggregate the scores of employees of a corporation) or on an industry-level by aggregating scores from participants employed by a particular industry (e.g. as determined from the customer CRM data 108).

Services in module 140 query graph database 122. In an embodiment, the services module 140 may include a matcher that match interests for each of the participants with the interest group interests.

The services module 140 may further determine for each of the interest groups a ranked list of interest group interests. For example, an interest group that sells products may be interested in topics such as new technologies or problems encountered by users for example. In an embodiment, the services module 140 matches the degree of interest for each of the participants with the interest group interests and determines a relevancy parameter there between. In an embodiment, when the relevancy parameter for a participant's degree of interest and with the interest group interests is equal to or above a threshold value, a signal 142 may be transmitted to a representative of the interest group such as by cellular phone 54A. The signal 142 may notify the representative that the particular participant may be a good candidate for a focus group or as a beta tester for a new product for example.

In an embodiment, the signal 142 may include a text message, a phone message, or another type of electronic message. The signal 142 may include the participant's contact information, the company they are employed by, the industry group of their employer, the participant's location and the participant's interests.

Figure 5:
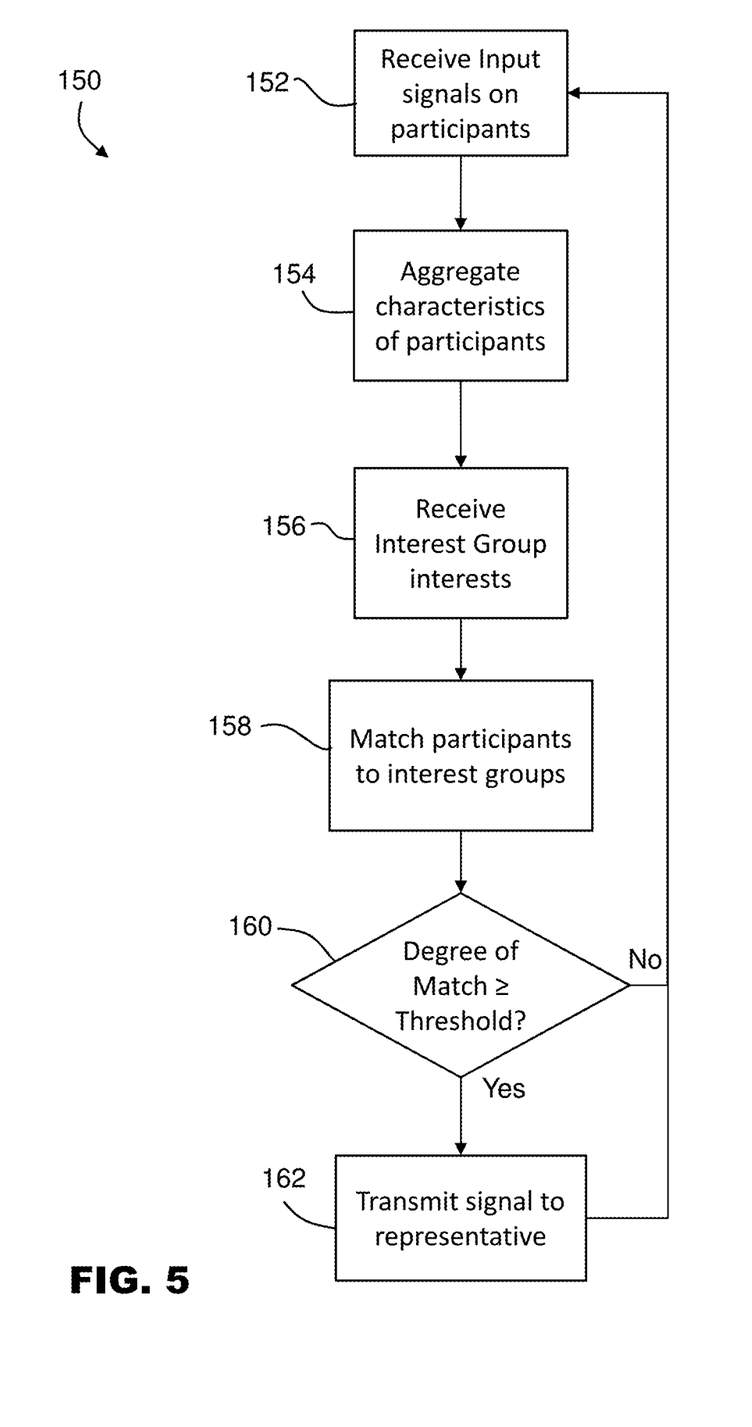
FIG. 5 depicts a flow diagram of a method of matching the interests of participants with those of an interest group in accordance with some embodiments.

Referring now to FIG. 5, a method 150 is shown for matching the interests of participants at a venue with those of the interest groups. The method 150 begins in block 152 where input signals representing characteristics of the participants are received. The input signals may be from the data sources 104 for example. The input signals may also be received from sensors positioned within the venue, such as from a room entrance monitor, a room exit monitor, an RFID reader, an NFC reader or a bar code reader for example.

The method 150 then proceeds to block 154 where the participant behavioral characteristics and the common session characteristics are aggregated. The method 150 then proceeds to block 156 where the interest group interests are received. The degree of interest in a topic for each participant is then determined and matched with the interest group interests in block 158.

The method 150 then proceeds to query block 160 where it is determined whether the degree of match or the relevancy parameter of the interests is equal to or greater than a threshold. In one embodiment, the threshold is user defined such that each interest group or each representative in each interest group may define its own threshold. In other embodiments, the threshold is defined for the system 100. When the query block 160 returns a positive, meaning there is a desired level of match between the interests of the participant and the interest group, then the method 150 proceeds to block 162 where an output signal is transmitted to the representative of the interest group. After transmission of the signal, or when the query block 160 returns a negative, the method 150 loops back to block 152. It should be appreciated that the method 150 may be performed on a periodic or an aperiodic basis based on the receipt of the input signals as discussed herein.

Figure 6:
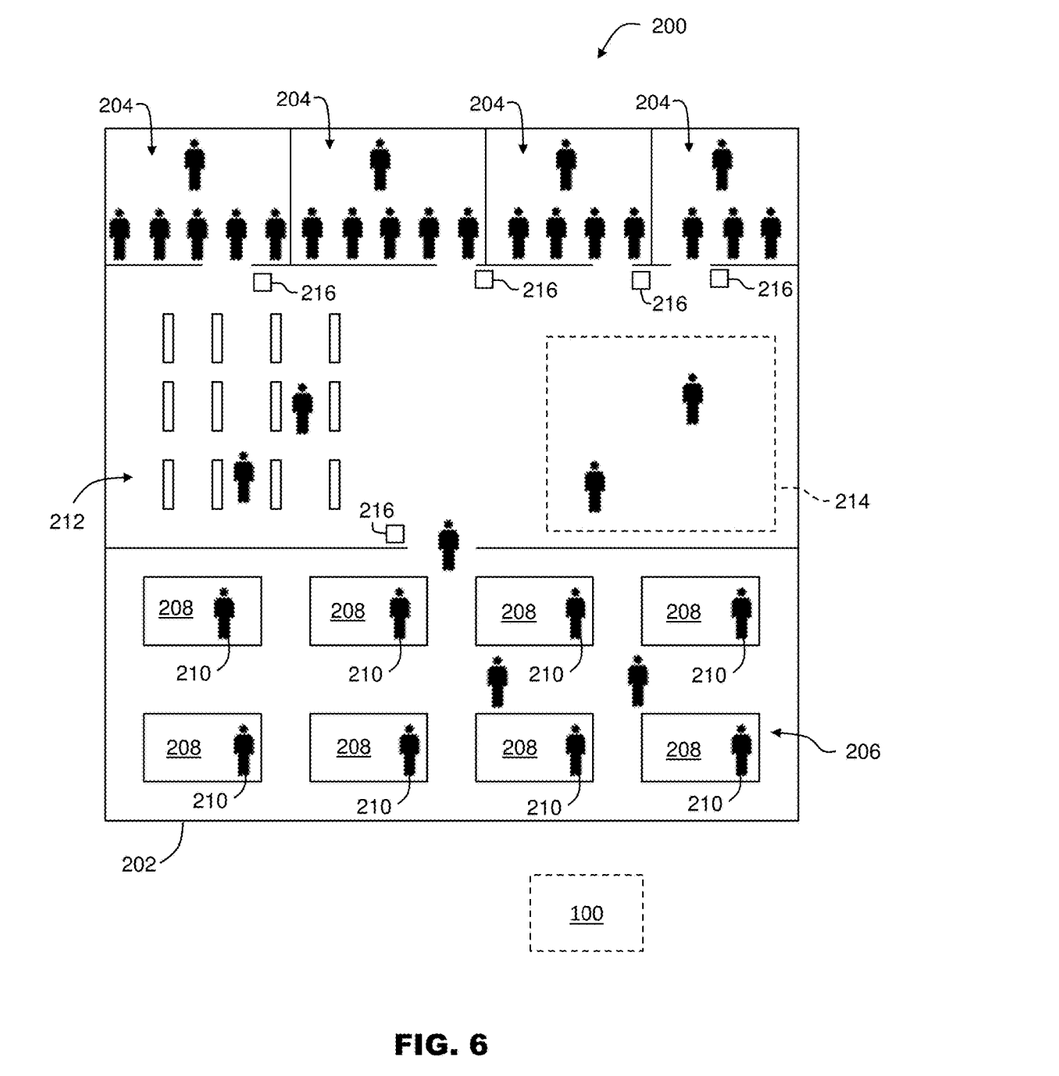
FIG. 6 depicts a schematic diagram of a venue in accordance with some embodiments.
Figure 7:
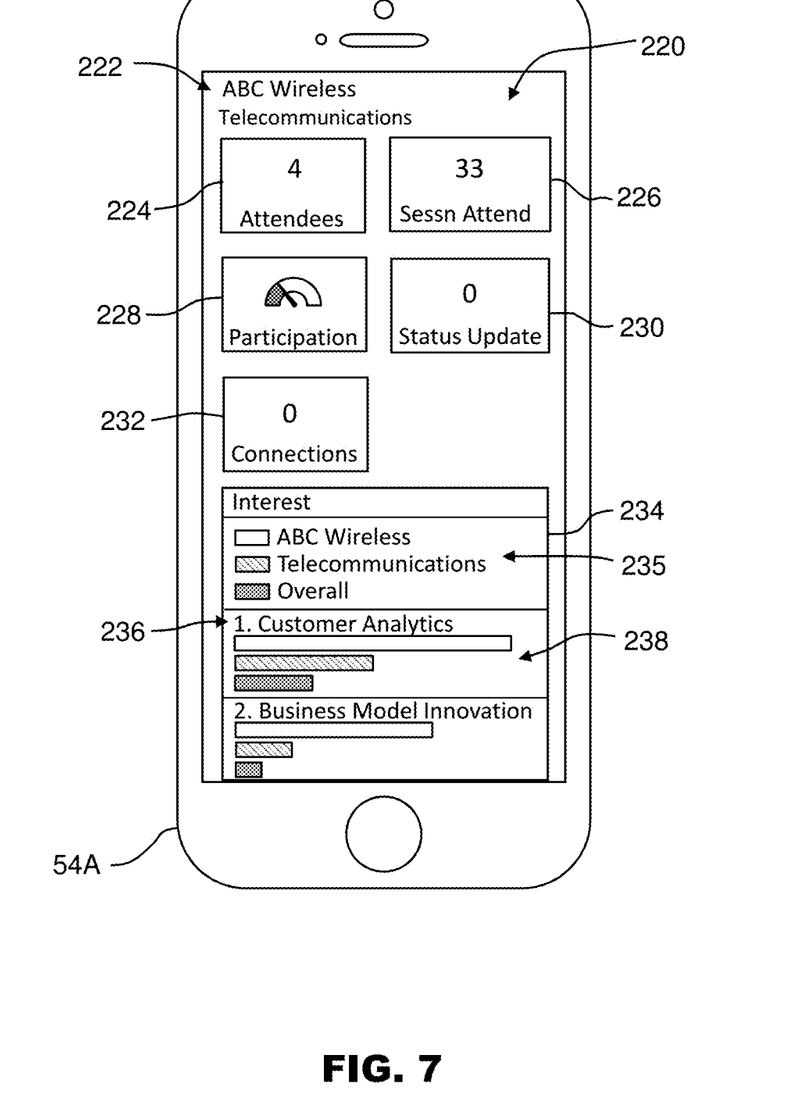
FIG. 7 depicts a mobile computing device having a graphical user interface for use with the system of FIG. 3 or method of FIG. 4 in accordance with some embodiments.
Figure 8:
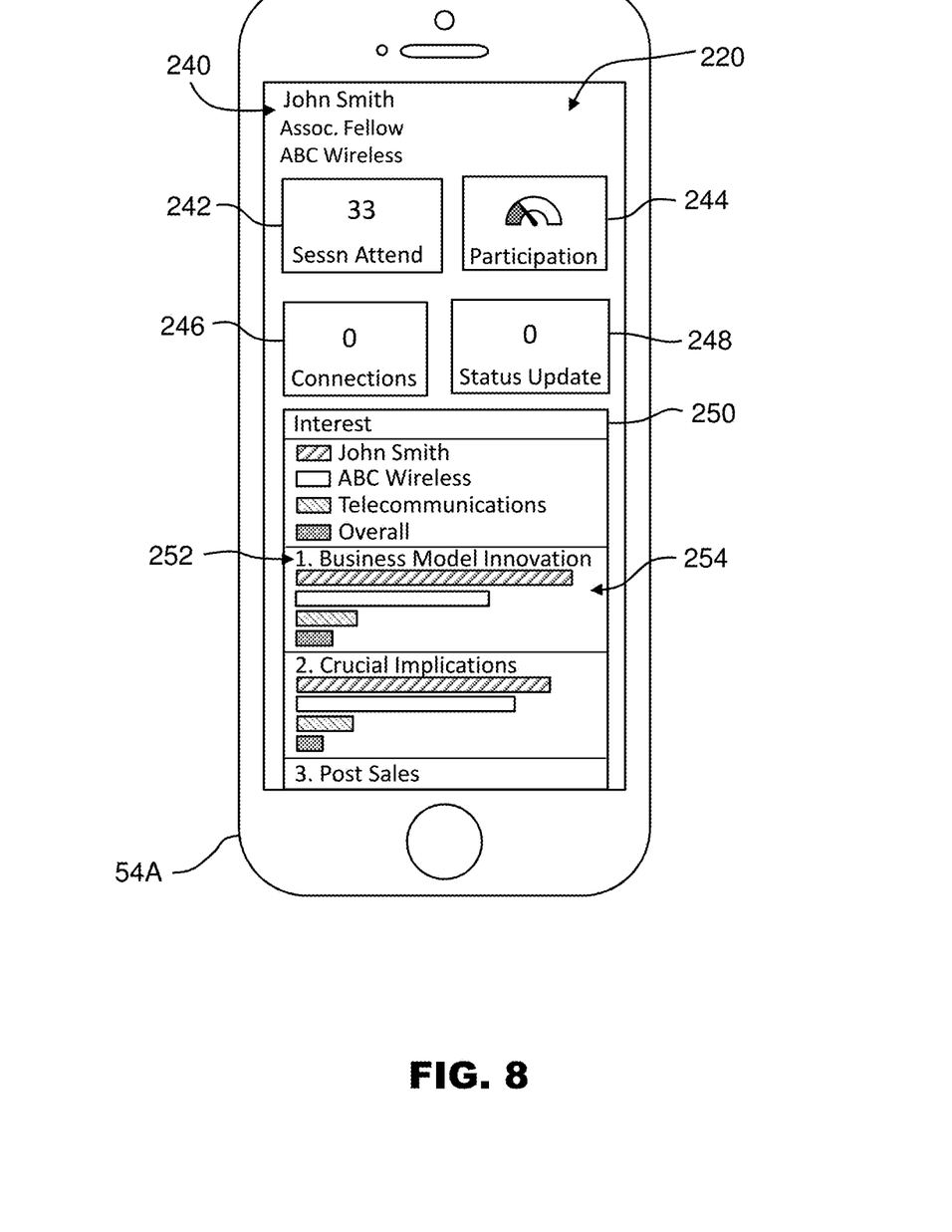
FIG. 8 depicts a mobile computing device having another graphical user interface for use with the system of FIG. 3 or method of FIG. 4 in accordance with some embodiments.

Referring now to FIGS. 6-8, an example is shown of the system 100 and method 150 for a venue 200. In this embodiment, the venue 200 is a conference, such as a technical conference or a trade show for example. The venue 200 takes place in a conference center 202 having a plurality of session rooms 204 and a vendor area 206. The session rooms 204 provide conference participants with the opportunity to receive presentations on topic(s) relevant to the conference. In an embodiment, the vendor area 206 may include booths 208 associated with booth owners, such as interest groups. The interest groups may have representatives 210 at the booths to provide information to the participants. In an embodiment, the conference center 202 may include additional areas, such as a poster session area 212 and a socializing or refreshment area 214 for example.

In an embodiment, the venue 200 includes a plurality of sensors 216 that monitor the occupants of the conference center. The sensors 216 may allow the venue organizers to control access to the session rooms 204 and other parts of the venue to ensure that only participants of the conference are admitted for example. The sensors 216 may include, but are not limited to a room entrance monitor, a room exit monitor, an RFID reader, a near field communications (NFC) reader and a bar code reader for example. In an embodiment, the participants may have an identification device, such as a badge or wristlet for example, that includes a machine readable identification means, such as a bar code or a radio frequency circuit for example. The machine readable identification means is detected and read by the sensors 216 and transmits an input signal to the matcher or matching system 100 for example. In another embodiment, the sensors 216 may detect biometric parameters, such as a fingerprint or retina for example, or may use facial image recognition to identify the participant. The sensors 216 transmit these input signals to the system 100 as described herein above. In this way, the system 100 may determine the topics of interest to each participant and their current location to facilitate the matching of the participant with an interest group.

In an embodiment, the venue 200 may include additional sensors 216, such as in the booths 208 for example. The sensors 216 may be used to facilitate the distribution of information to the participant (e.g. the participant scans their identification at a particular booth and literature or samples from the interest group of that booth are automatically sent to the participant). The signals from the booth sensors may also be used to determine the participant's topics of interest. In still further embodiments, additional sensors may be incorporated to receive or scan in survey/feedback forms from the participants.

In operation, the system 100 collects data as the participants enter and exit the session rooms 204 to determine which sessions each participant attended and the attendance duration (e.g. the attendance is being ratio of the attendance duration to the duration of the session). The system may further collect data on other places the participant has visited in the conference center 202, such as the poster session 212 for example. In an embodiment, the input signals may include which posters the participant viewed and the duration of the viewing. From this data and other data sources (e.g. attendee CRM 108, survey data 110, social media 112), the system 100 defines the interests and their relevance and determines when a degree of interest is identified between a participant and one of the interest groups. It should be appreciated that in an embodiment, the use of sensor data in combination with other data sources may allow for the real-time or near real-time determination of topics of interest of the participants in the venue.

In an embodiment, the system 100 transmits an output signal to one or more of the representatives 210 of an interest group when a relevancy parameter between a participants and the interest groups degree of interest is equal to or exceeds a threshold. Referring now to FIG. 7 and FIG. 8, an embodiment is shown of the graphical user interface 220 on the representative's mobile computing device 54A that displays the data and information from the output signal. In an embodiment, the output signal is pushed or transmitted to the representative automatically without any action on the part of the representative. In other embodiments, the representative may "pull" the output signal by transmitting a signal to the system 100 and requesting information. In still another embodiment, the participants may also receive the output signal to assist them in identifying interest groups that may assist them in the topics they may be interested in.

In the embodiment of FIG. 7, the graphical user interface 220 includes a plurality of elements related to an organization, such as a corporation. These elements include an identification element 222, such as an organization name and the industry category for example. The elements may include metric data for the employees of that organization relative to the conference, such as the number of participants from that organization 224, the number of sessions attended 226 by those participants, the participation rate 228 of those employees, a status update 230 and the number of connections made 232.

The graphical user interface 220 may also include an interest summary element 234. The interest summary 234 may include topics 236 identified by the system 100 and a ranking of the topics based on the aggregated scores of the organizations employees. In an embodiment, the interest summary 234 may include a legend area 235. The topics 236 may be in the form of bar charts 238 that compare the organizations interest in that topic and compare it with the industry group associated with the organization and the overall conference.

The graphical user interface 220 shown in FIG. 8 is similar, but directed to the interests of a particular participant. In this embodiment, the graphical user interface 220 includes an identification element 240 that includes information such as the participants name, title and organization. The graphical user interface 220 may also include overall conference information on the participant, such as the number of sessions attended 242, the participant's participation rate 244, the number of connections 246 and a status update 248. The graphical user interface 220 may further include an interests summary element 250. The interest summary 250 may include topics 252 identified by the system 100 and a ranking of the topics based on the data, including data collected at the venue. In an embodiment, the interest summary 250 may be in the form of bar charts 254 that compare the participant's interest in that topic and compare it with the organization that they are employed by or associated with, the industry group associated with the organization and the overall conference.

In one embodiment, each the participant may be able to view the graphical user interface 220 on their own mobile computing device.

Technical effects and benefits of some embodiments include providing a system for matching the interests of participants at a venue and those of an interest group in real-time or near real-time based on input signals, including input signals from sensors at the venue.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   one or more computer inputs configured to receive input signals from at least a room entrance monitor and a room exit monitor, the input signals identifying locations of one or more participants in a venue, the venue having one or more sessions, wherein the one or more computer inputs are configured to identify a respective session location of the venue for each session attended to by the one or more participants;
   a timer coupled for communication to the one or more computer inputs, wherein the timer is configured to determine a respective session attendance time for each of the one or more participants for each session attended to by the one or more participants, wherein the session attendance times are determined based on the identified locations of the one or more participants and on the identified session locations of the venue;
   an aggregator coupled for communication to the one or more computer inputs and to the timer, the aggregator configured to determine one or more interests of each of the one or more participants by aggregating common session characteristics with participant behavioral characteristics and ranking a degree of interests for each of the one or more participants, wherein the participant behavioral characteristics includes the session attendance times;
   a matcher coupled for communication to the aggregator and configured to receive one or more interest group ranked lists of interest group interests for each of one or more interest groups, each of the one or more interest groups including at least one representative, the matcher further configured to match one or more of the one or more interest groups to one or more of the one or more participants by matching the degree of interests for each of the one or more participants to the interest group interests based, at least in part, on: (a) a topics relevancy ranking for each of the one or more participants, (b) a ratio between a session attendance time of each of the one or more participants and a total duration of a session, (c) a session weight, and (d) a number of co-occurrences of the same topic among sessions attended to by the one or more participants, wherein the topics relevancy ranking for each of the one or more participants is adjusted based on the ratio; and
   a signal output coupled for communication to the matcher, the signal output being configured to transmit an output signal to the at least one representative based on a relevancy parameter between the degree of interests of one of the one or more participants and the one or more interest groups associated with the at least one representative is above a threshold.

2. The system of claim 1, wherein the venue is an interaction between two of more of the one or more participants during a predetermined period of time.

3. The system of claim 1, wherein the one or more sessions are defined by a physical location, a time duration and a delivery information form.

4. The system of claim 1, wherein the one or more interest groups includes at least one of a corporation, a trade association, a social group and a client organization.

5. The system of claim 1, wherein the representative is at least one of a sales person, a venue organizer, a booth owner or a vendor.

6. The system of claim 1, wherein the common session characteristics include at least one of venue session topics, session materials, social media data and speaker identity.

7. The system of claim 1, wherein the input signals are further received from at least one of an RFID reader or a bar code reader.

8. The system of claim 1, wherein the output signal is a message that includes client information, location and interests, wherein the message is at least a text message, a phone message, or an electronic message.

9. A method comprising:

receiving input signals at one or more computer inputs from at least a room entrance monitor and a room exit monitor, the input signals identifying locations of one or more participants in a venue having one or more sessions and identifying a respective session location for each session attended to by the one or more participants;

determining, via a timer coupled to the one or more computer inputs, a respective session attendance time for each of the one or more participants for each session attended to by the one or more participants, wherein the session attendance times are determined based on the identified locations of the one or more participants and on the identified session locations of the venue;

determining with an aggregator one or more interests of each of the one or more participants by aggregating common session characteristics with participant behavioral characteristics and ranking a degree of interests for each of the one or more participants, wherein the participant behavioral characteristics includes the session attendance times;

receiving one or more interest group ranked lists of interest group interests for each of one or more interest groups;

matching with a matcher one or more of the one or more interest groups to one or more of the one or more participants by matching the degree of interests to the interest group interests based, at least in part, on: (a) a topics relevancy ranking for each of the one or more participants, (b) a ratio between a session attendance time of each of the one or more participants and a total duration of a session, (c) a session weight, and (d) a number of co-occurrences of the same topic among sessions attended to by the one or more participants, wherein the topics relevancy ranking for each of the one or more participants is adjusted based on the ratio; and transmitting an output signal to one or more representatives based on a relevancy parameter between the degree of interests of one of the one or more participants and the one or more interest groups associated with the at least one representative is above a threshold.

10. The method of claim 9, wherein an individual session is defined by a physical location, a time duration and a delivery information form.

11. The method of claim 9, further comprising receiving the input signals further from at least one of an RFID reader or a bar code reader.

12. The method of claim 9, wherein the venue is an interaction between two or more participants during a predetermined period of time.

13. The method of claim 9, wherein:

the one or more interest groups are at least one of a corporation, a trade association, a social group and a client organization; and the representative is at least one of a sales person, a venue organizer, a booth owner and a vendor.

14. A computer program product for matching a participant with an interest group at a venue, the computer program product comprising a computer readable storage medium having program instructions embodied therewith, the program instructions executable by a processor to cause the processor to perform:

receiving input signals at one or more computer inputs from at least a room entrance monitor and a room exit monitor, the input signals identifying locations of one or more participants in the venue having one or more sessions and identifying a respective session location for each session attended to by the one or more participants;

determining, via a timer coupled to the one or more computer inputs, a respective session attendance time for each of the one or more participants for each session attended to by the one or more participants, wherein the session attendance times are determined based on the identified locations of the one or more participants and on the identified session locations of the venue;

determining one or more interests of each of the one or more participants by aggregating common session characteristics with participant behavioral characteristics and ranking a degree of interests for each of the one or more participants, wherein the participant behavioral characteristics includes the session attendance times;

receiving one or more interest group ranked lists of interest group interests for each of one or more interest groups;

matching one or more of the one or more interest groups to one or more of the one or more participants by matching the degree of interests to the interest group interests based, at least in part, on: (a) a topics relevancy ranking for each of the one or more participants, (b) a ratio between the session attendance time of each of the one or more participants and total a duration of a session, (c) a session weight, and (d) a number of co-occurrences of the same topic among sessions attended to by the one or more participants, wherein the topics relevancy ranking for each of the one or more participants is adjusted based on the ratio; and transmitting an output signal to one or more representatives based on a relevancy parameter between the degree of interests of one of the one or more participants and the interest group associated with the at least one representative is above a threshold.

15. The computer program product of claim 14, wherein the one or more sessions are defined by a physical location, a time duration and a delivery information form.

16. The computer program product of claim 14 wherein the program instructions further cause the processor to perform receiving the input signals further from at least one of an RFID reader or a bar code reader.

17. The computer program product of claim 14, wherein the output signal is a message that includes client information, location and interests, wherein the message is at least a text message, a phone message, or an electronic message.

* * * * *